United States Patent [19]

Ooi

[11] Patent Number: 4,833,642

[45] Date of Patent: May 23, 1989

[54] CACHE CONTROLLER GIVING VERSATILITY TO CACHE MEMORY STRUCTURE

[75] Inventor: Yasushi Ooi, Tokyo, Japan

[73] Assignee: NEC Corporation, Tokyo, Japan

[21] Appl. No.: 176,008

[22] Filed: Mar. 31, 1988

[30] Foreign Application Priority Data

Mar. 31, 1987 [JP] Japan .................................. 62-77931

[51] Int. Cl.[4] ............................................. G11C 15/00
[52] U.S. Cl. ...................................... 365/49; 364/200;
364/900
[58] Field of Search .................... 365/49; 364/200, 900

[56] References Cited

U.S. PATENT DOCUMENTS 4,755,974  7/1988  Yamada et al. ......................... 365/49
4,758,982  7/1988  Price .................................... 364/900

Primary Examiner—Terrell W. Fears
Attorney, Agent, or Firm—Foley & Lardner, Schwartz, Jeffery, Schwaab, Mack, Blumenthal & Evans

[57] ABSTRACT

An associative type cache controller includes a plurality of directory banks each holding an address tag of a cache block, each of the directory banks having a comparison circuit for comparing the content of the directory bank with a tag portion of a current reference address. The cache controller comprises a register for holding the association unit number, and a replacement block determining unit for indicating, in accordance with the content of the association unit number holding register, the directory bank including the cache block to be replaced at the time of cache replacement, so that the replacement directory banks are limited in accordance with the designated association unit number. Thus, the association unit number of a related cache memory can be changeably designated.

2 Claims, 6 Drawing Sheets

CACHE CONTROLLER GIVING VERSATILITY TO CACHE MEMORY STRUCTURE

BACKGROUND OF THE INVENTION

1. Field of the invention

The present invention relates to a cache memory, and more specifically to a cache controller capable of giving a high versatility of cache memory structure.

2. Description of related art

Large computers, which have been called a "main frame", and a high rank of minicomputers comprise a cache memory as an indispensable element for the purpose of speeding up the access to a main memory. In these large and intermediate sizes of computers, the cache memories have been designed to be closely coupled to a central processor (CPU) so that an optimum cost performance is realized in relation to the CPU. In brief, a logic unit associated to the cache memory is made sufficiently integral with the CPU. Accordingly, the cache unit has a fixed cache memory structure and association unit number and is not made into the form of a module or discrete unit.

On the other hand, so-called personal computers and a small size of systems such as a "engineering work station" have a multi-chip hardware logic which is composed of standard integrated circuits. For example, most of the hardware logic includes several boards to ten and several boards.

At present, the above small scaled computers are required to have performance comparable to the main frame, and it has already become possible from a technical aspect. Accordingly, it is a matter of course that the small scaled computers need the cache memory. Today, there can already be found a single board computer having a cache memory composed of discrete integrated circuits to utilize the performance of the CPU to a maximum extent.

An important feature of the small size of computers lies upon an elaborated utilization of standard integrated circuits (LSIs) as well as versatility of system structure composed of standard parts. This makes it possible to achieve two objects apparently inconsistent to each other, namely, mass production of the system which is one important condition of domestic products, and multikind and small-quantity production for complying diversification in accordance with various requests of users.

In fact, even in the field of the small size of computers, the personal computer and the engineering work station are different in required performance, in the degree of specialization and generalization, and in permitted production cost. In other words, these computers have a different equilibrium point between cost and performance.

As a result, the cache memory used in the small size of computers has a different equilibrium point between cost and performance, in accordance with the type of computers. For example, the performance of the cache memory is determined by an average memory access time which is dependent upon a cache hit ratio, a cache access time and a miss hit ratio. The cache hit ratio is a function of a total size of cache, a block size of cache, the number of association units (associability; n-way), a fetch algorithm, etc. The cache access time is dependent upon a clock frequency for cache access operation, an output delay time for each element, an input setting time of each element, etc. Further, the miss hit ratio depends upon the amount of bus interface logic elements, a bus transfer speed, a bus availability ratio, etc. On the other hand, the manufacturing cost for cache memories is determined by a unit price of elements used, a total amount of logic elements used, a fixed expense, etc. The total amount of logic elements used is dependent upon a total size of cache, a block size of cache, the number of association units (associability; n-way), the amount of bus interface logic elements, etc.

As seen from the above, in order to elevate the performance of a cache memory, it is necessary to improve the cache access time, the cache hit ratio, and others. On the other hand, the manufacture cost depends directly upon the unit prices and the number of necessary parts. In addition, it would be a matter of course that improvement of performance by modifying hardware will result in increase of cost.

The factor dependent upon the cost is not limited to only the performance, but also reliability depends upon the cost. The reason for this is that an increase in redundancy of hardware will inevitably accompany the cost-up.

Accordingly, in order to realize a high performance cache memory, it is of course necessary to freely use an advanced integrated circuit technology to a maximum extent so as to manufacture high performance and multifunction parts. However, only the advanced integrated circuit cannot provide a cache memory which sufficiently satisfies both the cost and the performance, dependently upon various requests based on different applications. In general, the multikind and small-quantity production will result in an increase of cost.

SUMMARY OF THE INVENTION

Accordingly, it is an object of the present invention to provide a cache controller capable of realizing a cache memory which has overcome the above mentioned defect of the conventional one.

Another object of the present invention is to provide a cache controller capable of realizing various cache memory structures of cache memories at a low cost.

A further object of the present invention is to provide a cache controller giving a high versatility to a cache memory so that the memory structure of the cache memory can be modified in accordance with various applications without modification of hardware.

A still further object of the present invention is to provide a cache controller giving such a versatility to a cache memory as to comply several equilibrium points between the memory element number per association unit and the cache hit ratio.

If the association unit number is made programmable, it is possible to permit a low cost cache controller which can comply with some typical system structures.

The larger the association unit number becomes, the higher the degree of freedom in mapping of a cache memory becomes. Therefore, the cache hit ratio is elevated, so that an average access time is improved, resulting in elevation of performance. To the contrary, the cost for selection of memory elements to be read is increased, and therefore, to obtain an appropriate performance, there is required an arrangement capable of accessing in parallel to memory elements of the same number as the association unit number. In other words, the number of parts required is increased.

On the other hand, if the association unit number is made small, the degree of freedom in mapping for cache memory is also decreased, but the cost for selection of memory elements to be read is decreased, so as to reduce the number of required memory elements. However, if a recently advanced memory elements having a very large storage capacity is used, it is possible to compensate a decrease of the cache hit ratio which is caused by decreasing the association unit number. One paper states that an improvement of the cache hit ratio obtained by increasing the association unit number from 2 to 4 under the same cache capacity is substantially comparable with that which can be obtained by increasing the cache capacity to four times under the same association unit number.

The above and other objects of the present invention are achieved in accordance with the present invention by an associative type cache controller which includes a plurality of directory banks each holding an address tag of a cache block, each of the directory banks having a comparison means for comparing the content of the directory bank with a tag portion of a current reference address, comprising means for holding the association unit number, and replacement block determining means for indicating, in accordance with the content of the association unit number holding means, the directory bank including the cache block to be replaced at the time of cache replacement, so that the replacement directory banks are limited in accordance with the designated association unit number, with the result that the association unit number of a related cache memory can be changeably designated.

In one preferred embodiment, the replacement block determining means is adapted to indicate, in accordance with the content of the association unit number holding means and a portion of the tag of the current reference address, the directory bank including the cache block to be replaced at the time of cache replacement, so that the replacement directory banks are designated in accordance with the designated association unit number with the result that a plurality of directory bank groups operate as one association unit.

The above and other objects, features and advantages of the present invention will be apparent from the following description of preferred embodiments of the invention with reference to the accompanying drawings.

DESCRIPTION OF THE PREFERRED EMBODIMENTS

Figure 1:
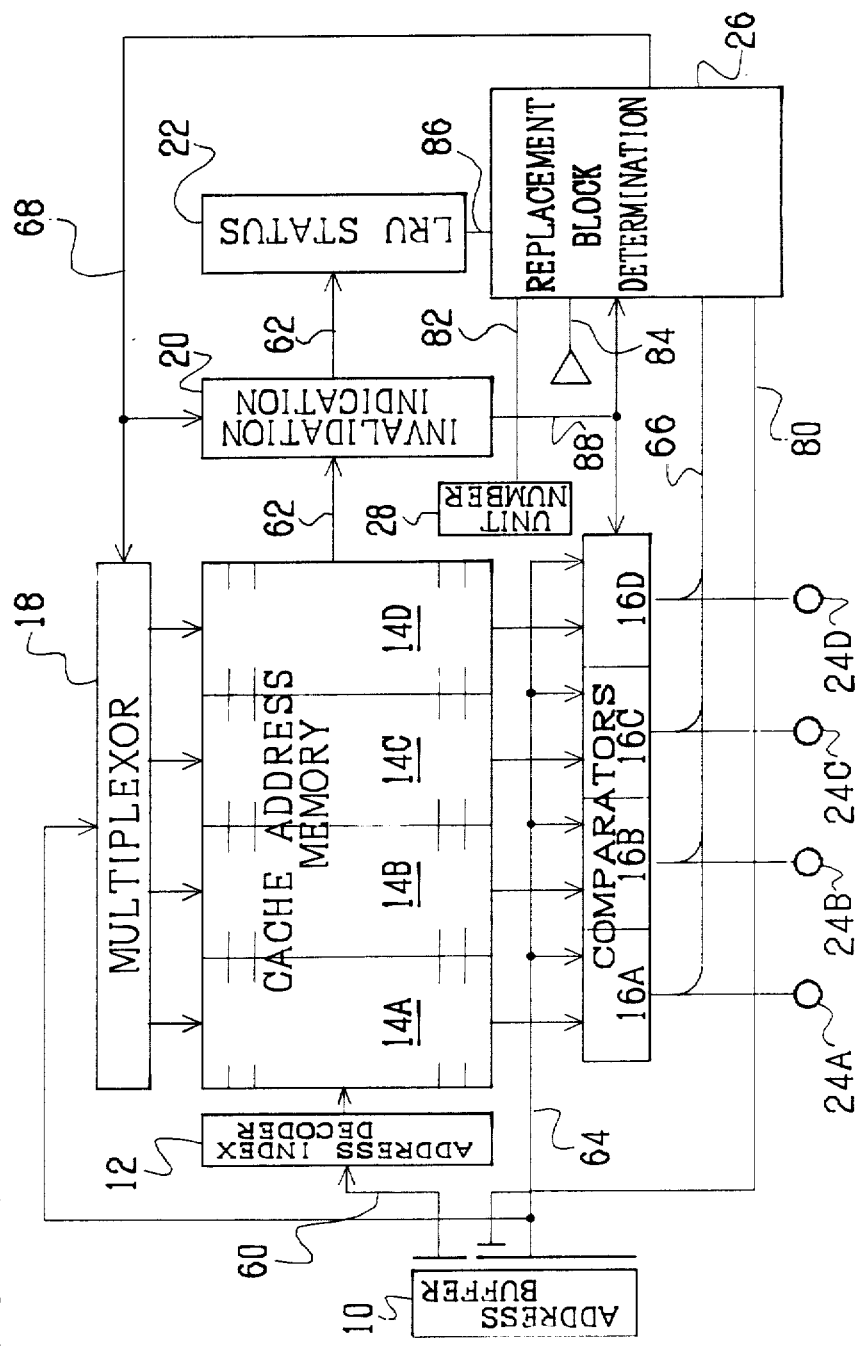
FIG. 1 is a block diagram of one embodiment of the cache controller in accordance with the present invention.

Referring to FIG. 1, there is shown a first embodiment of the cache controller in accordance with the present invention.

The shown cache controller comprises an address buffer 10 for temporarily holding an address outputted from a host processor (not shown), and an address index field decoder 12 coupled to receive an address bus index field 60 from the address buffer 10 and to output an address index field decoded signal 62 to cache address memories 14A, 14B, 14C and 14D. Comparators 16A, 16B, 16C and 16D are coupled at their one inputs to the memories 14A to 14D and at their other inputs commonly to receive an address bus tag field 64 from the address buffer 10. In addition, there is provided a replacement address tag multiplexor 18 having an input connected to receive the address bus tag field 64 from the address buffer 10. Outputs of this multiplexor 18 are connected to the cache address memories 14A, 14B, 14C and 14D, respectively. Further, the address index field decoded signal 62 is also coupled to an invalidation indication memory 20 and a least recently used (LRU) status memory 22.

The comparators 16A to 16D respectively generate hit block indication signals 66 at their outputs which are coupled to cache address strobe terminals 24A, 24B, 24C and 24D. These hit block indication signals 66 are coupled to a replacement block determination unit 26, which also receives a lower place portion 80 of the address bus tag field 64 from the address buffer 10 and an association unit number 82 from an association unit number hold register 28. Further, the replacement block determination unit 26 receives a LRU status write acknowledge signal 84, a LRU status signal 86 and an invalidation block induction signal 88. On the other hand, the replacement block determination unit 26 supplies a replacement directory bank indication signal 68 to the multiplexor 18 and the invalidation indication memory 20.

Figure 2:
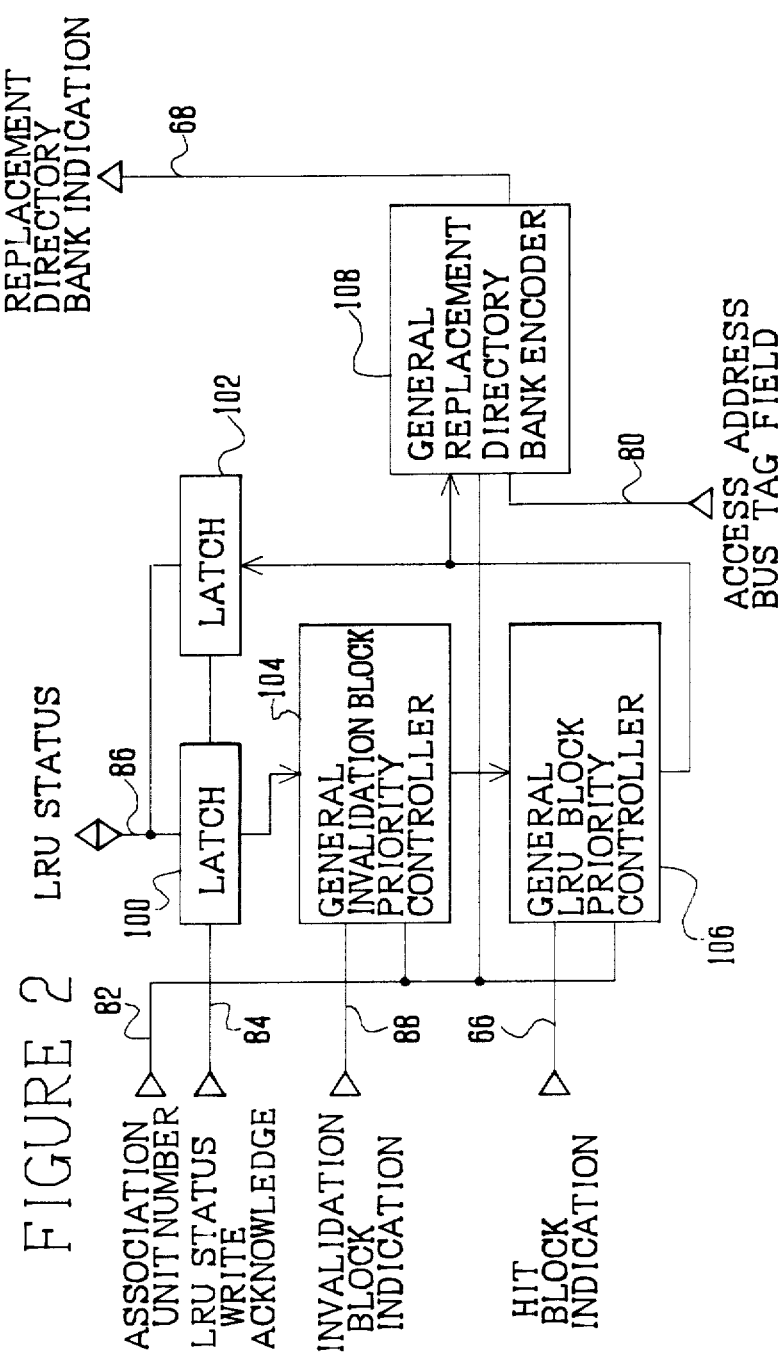
FIG. 2 is a block diagram of the replacement block determination unit used in the cache controller shown in FIG. 1.

Turning to FIG. 2, the replacement block determination unit 26 includes a pair of latches 100 and 102 respectively coupled to receive and supply the LRU status signal 86 and is controlled by the LRU status write acknowledge signal 84. The latch 100 is coupled to a general invalidation block priority controller 104, which is connected to receive the association unit number signal 82 and the invalidation block indication signal 88. The general invalidation block priority controller 104 is coupled to a general LRU block priority controller 106, which is in turn connected to receive the association unit number signal 82 and the hit block indication signal 66. Further, the general LRU block priority controller 106 is coupled to the latch 102 and a general replacement directory bank encoder 108 which is also connected to receive the association unit number signal 82 and the portion 80 of the address bus tag field 64 for generating the replacement directory bank indication signal 68.

Figure 3:
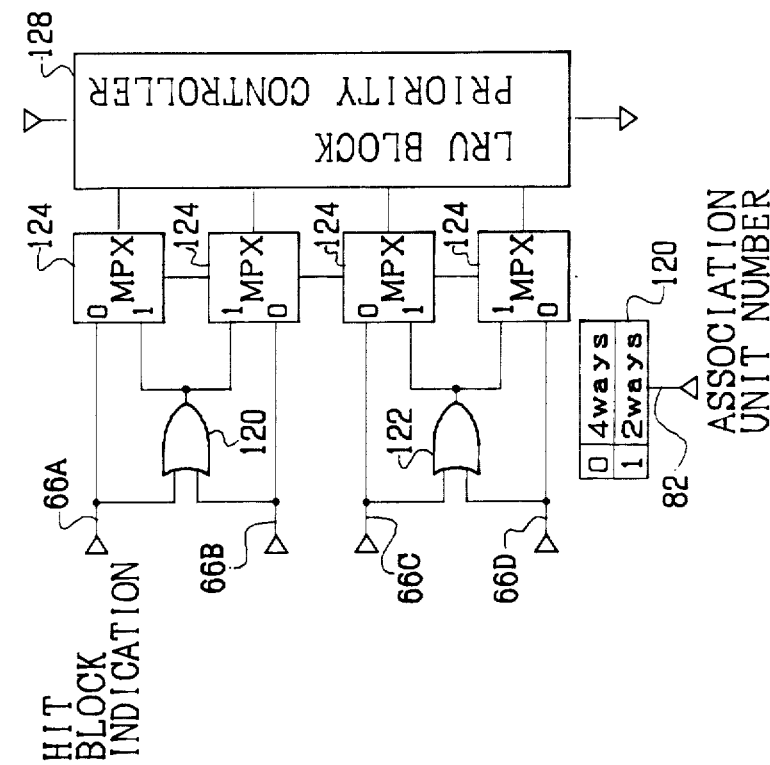
FIG. 3 is a block diagram of the general invalidation block priority controller used in the cache controller shown in FIG. 1.

As shown in FIG. 3, the general invalidation block priority controller 104 includes a pair of two-input AND gates 110 and 112 which receive the invalidation block indication signals 88A, 88B, 88C and 88D from the invalidation indication memory 20 which correspond to the respective blocks of the cache memory. These invalidation block indication signals 88A, 88B, 88C and 88D and respective outputs of the two AND gates 110 and 112 are coupled to four multiplexors 114, as shown in the drawing. These multiplexors 114 are controlled by a selection control logic 116 which receives the association unit number signal 82. An output of each of the multiplexors 114 are coupled to a invalidation block priority controller 118 which is ordinarily used in a replacement block determination unit of conventional cache controllers.

Figure 4:
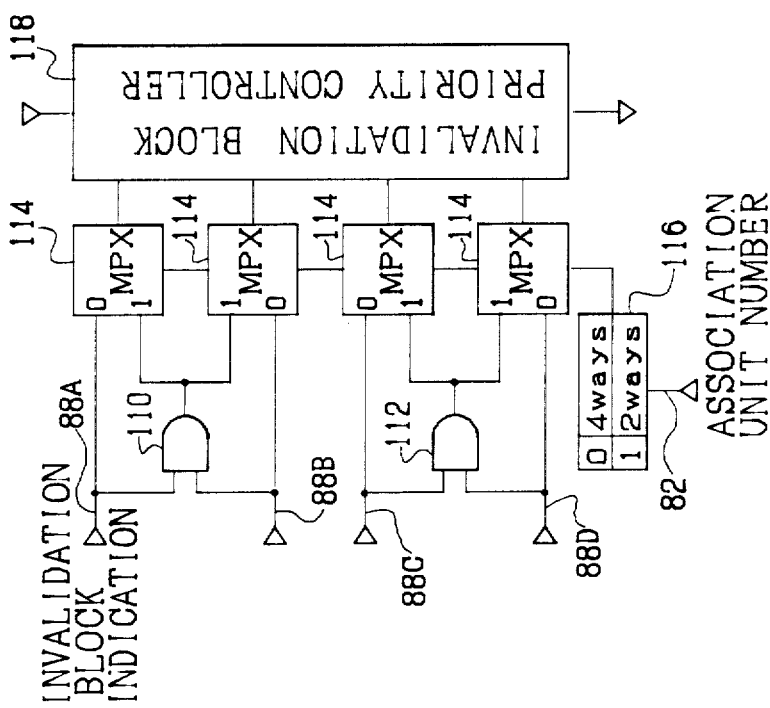
FIG. 4 is a block diagram of the general LRU block priority controller used in the cache controller shown in FIG. 1.

Turning to FIG. 4, the general LRU block priority controller 106 includes a pair of two-input OR gates 120 and 122 which receive the hit block indication signals 66A, 66B, 66C and 66D from the comparators 16A, 16B, 16C and 16D. These hit block indication signals 66A, 66B, 66C and 66D and respective outputs of the two OR gates 120 and 122 are coupled to four multiplexors 124, as shown in the drawing. These multiplexors 124 are controlled by a selection control logic 120 which receives the association unit number signal 82. An output of each of the multiplexors 124 are coupled to a LRU block priority controller 128 which is ordinarily used in a replacement block determination unit of conventional cache controllers.

Figure 5:
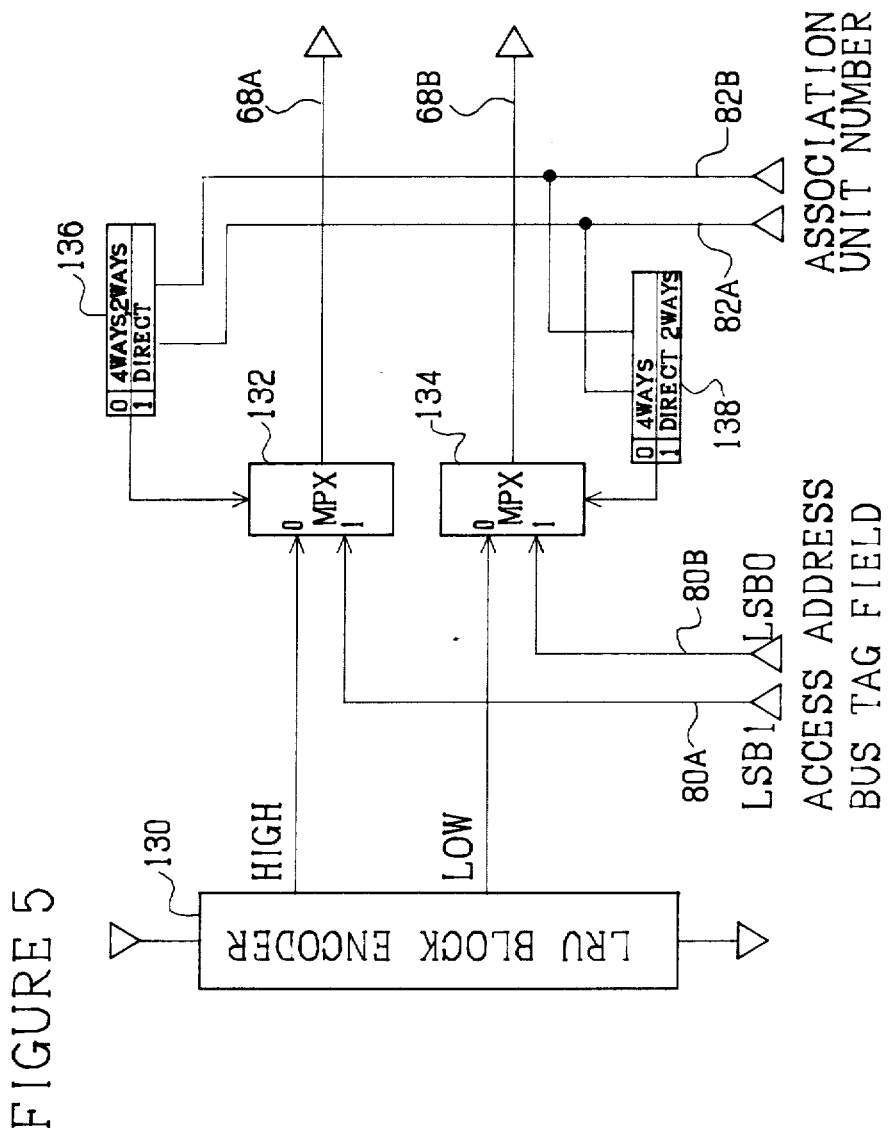
FIG. 5 is a block diagram of the general replacement directory bank encoder used in the cache controller shown in FIG. 1.

Further, as shown in FIG. 5, the general replacement directory bank encoder 108 includes a replacement directory bank encoder 130 which is ordinarily used in a replacement block determination unit of conventional cache controllers. A pair of outputs of the replacement directory bank encoder 130 are coupled to respective first inputs of a pair of multiplexors 132 and 134 which have their second inputs coupled to receive a least significant bit LSB0 and a next least significant bit LSB1 of the access address bus tag field 80, respectively. These multiplexors 132 and 134 are controlled by a pair of selection control logics 136 and 138, respectively, which respond to the association unit number signal 82A and 82B. Respective outputs of the multiplexors 132 and 134 are supplied as replacement directory bank indication signals 68A and 68B.

The above mentioned cache controller can be said to have been constituted by adding some number of circuit elements to the invalidation block priority controller 118, the LRU block priority controller 118 and the replacement directory bank encoder 130 of the conventional cache controller. Therefore, the above mentioned cache controller is characterized by the association unit number hold register 28 and the replacement block determination unit having detailed structures shown in FIGS. 3, 4 and 5. Therefore, the following explanation will be mainly directed to the featured portions of the embodiments, since the detailed constructions and operation of the other portions should have been well known to those skilled in the art.

In the above mentioned cache controller, one cycle of cache access is executed as follows: An address outputted from a host processor is supplied to the address buffer 10 so as to be used for searching a cache directory on the one hand and to be used for accessing a cache data memory (which will be explained hereinafter). The address index field 60 of the address buffer 10 is decoded by the decoder 12 to designate one column of each of the four memories 14A to 14D, and the content of the designated columns of the four memories are read out at the same time. The four read-out contents are then compared with the address tag field 64 of the address buffer 10 in the four comparators 16A to 16D.

Thus, the results of comparison as well as the invalidation block indication signals 88 from the memory 20 are outputted as the cache address probes 24A to 24D to an input/output buffer of a cache memory (which will be explained hereinafter) so that data is transferred between the content of corresponding memory elements and a data bus.

The result of comparison is also inputted as the hit block indication signal 66 to the replacement block determination unit 26. The hit block is notified as the most recently hit block to the LRU block priority controller 106. On the other hand, the invalidation block priority controller 104 responds to the invalidation block indication signal 88 to request the LRU block priority controller 106 to change the LRU status so as to preferentially delete the invalidation block. Thus, the LRU block priority controller 106 changes the content of the LRU status memory 22.

The output of the LRU block priority controller 106 is converted by the LRU block encoder 108 into the replacement directory bank indication signal 68 which indicates a replacement directory bank in the case of cache missing. This signal indicates all the four LRU blocks, in the case of the associative type cache memory whose association unit number is four.

However, the above mentioned cache controller can not only perform the above mentioned operation, but also allows selection between three association systems, i.e., a four-way set-associative system (abbreviated "four ways" hereinafter), a two-way set-associative system (abbreviated "two ways" hereinafter) and a direct mapping system. The selection is achieved by suitably setting the unit number register 28.

In the general invalidation block priority controller 104 shown in FIG. 3, the multiplexors 114 are controlled by the selection control logic 116 to output the invalidation block indication signals 88A, 88B, 88C and 88D to the invalidation block priority controller 118, respectively, in the case of the "four ways". On the other hand, in the case of the "two ways", the multiplexors 114 are controlled by the selection control logic 116 to select the outputs of the AND gates 110 and 112. Therefore, only when two blocks corresponding to the invalidation block indication signals 88A and 88B are to be invalidated, or only when two blocks corresponding to the invalidation block indication signals 88C and 88D are to be invalidated, the invalidation signal is outputted from the corresponding AND gate 110 and 112 through the multiplexors 114 to the invalidation block priority controller. This means that two blocks corresponding to the invalidation block indication signals 88A and 88B, and two blocks corresponding to the invalidation block indication signals 88C and 88D are respectively invalidated or maintained in the form of one integrated block, which is realized by reducing their associability, i.e., the association number.

Further, in the general LRU block priority controller 106 shown in FIG. 4, the multiplexors 124 are controlled by the selection control logic 126 to supply the hit block indication signals 66A, 66B, 66C and 66D to the LRU block priority controller 128, respectively, in the case of the "four ways". On the other hand, in the case of the "two ways", the multiplexors 124 are controlled by the selection control logic 126 to select the outputs of the OR gates 120 and 122. Therefore, if anyone of two blocks corresponding to the hit block indication signals 66A and 66B is hit, or if anyone of two blocks corresponding to the hit block indication signals 66C and 66D is hit, the hit signal is outputted from the corresponding OR gate 120 and 122 through the multiplexors 124 to the LRU block priority controller 128. Namely, if anyone of two blocks corresponding to the hit block indication signals 66A and 66B is hit, the two blocks are treated as having been hit. Accordingly, differently from the case of the conventional cache memory, a plurality of hit signals are applied to the the LRU block priority controller 128. However, this is not a problem, since it is regarded that two blocks corresponding to the hit block indication signals 66A and 66B, and two blocks corresponding to the hit block indication signals 66C and 66D are respectively hit in the form of one integrated block, which is realized by reducing their associability, i.e., the association number.

As mentioned above, the general replacement directory bank encoder 108 shown in FIG. 5 includes the multiplexors 132 and 134 receiving the outputs of the LRU block encoder 130 and the lower place portion 80A and 80B of the tag field of the mis-hitting current cache access address. The multiplexors 132 and 134 are controlled by the selection control logics 136 and 138 to select one of the respective two inputs in accordance with the association unit number signals 82A and 82B. Thus, in the case of "four ways", the outputs of the encoder 130 are outputted as the replacement directory bank indication signals 68A and 68B, without regard to the address tag field 80. On the other hand, in the case of the direct mapping system, the two least significant bits 80A and 80B of the address tag field are outputted as the replacement directory bank indication signals 68A and 68B, without regard to the outputs of the encoder 130. In the case of "two ways", the high place portion of the output of the encoder 130 and the lower place portion 80B of the address tag field constitute the replacement directory bank indication signals 68A and 68B, respectively.

Figure 6:
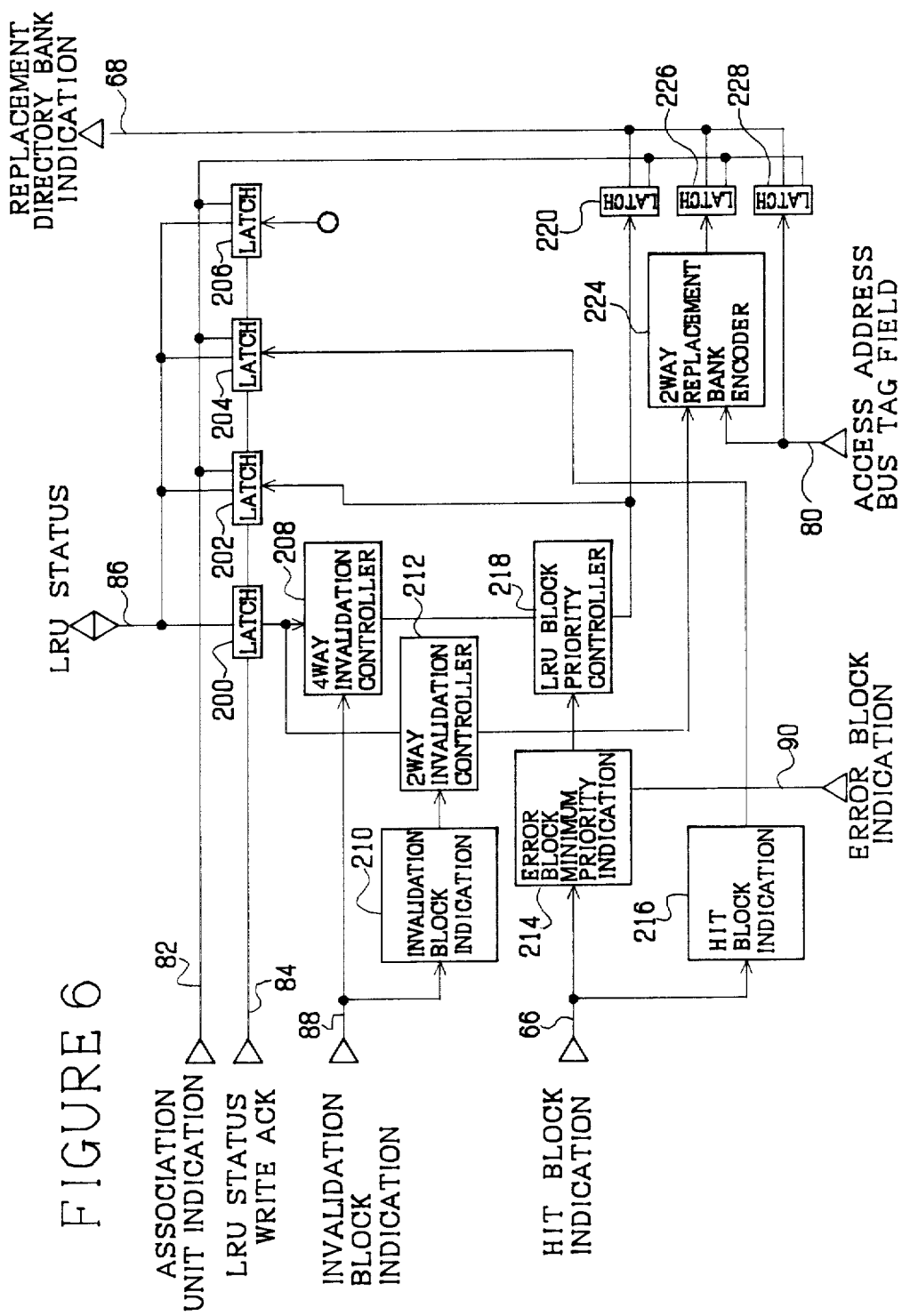
FIG. 6 is a block diagram of another embodiment of the replacement block determination unit used in the cache controller in accordance with the present invention.

Turning to FIG. 6, there is shown a block diagram of a second embodiment of the replacement block determination unit used in the cache controller in accordance with the invention. The shown replacement block determination unit includes four latches 200, 202, 204 and 206 coupled to receive or supply the LRU status signal 86 and controlled by the LRU status write acknowledge signal 84, and a "four way" invalidation block priority controller 208 coupled to the latch 200 and connected to receive the invalidation block indication signal 88. This invalidation block indication signal 88 is also supplied to an invalidation block indicator 210, which coupled to a "two way" invalidation block priority controller 212 also coupled to the latch 200.

In addition, the hit block indication signal 66 is inputted to a "four way" error block minimum priority indicator 214 and to a hit block indicator 216. The "four way" error block minimum priority indicator 214 is coupled to a "four way" LRU block priority controller 218 having an input coupled to an output of the invalidation block priority controller 208. An output of the LRU block priority controller 218 is connected to the latch 202 and another latch 220. The hit block indicator 216 has an output connected to the latch 204. Further, an output of the "two way" invalidation block priority controller 212 is inputted to a "two way" replacement bank encoder 224 which also receives the access address bus tag field 80. An output of the encoder 224 is coupled to a latch 226, and the access address bus tag field 80 is also latched in a latch 228. The latches 202, 204, 206, 220, 226 and 228 are latch-controlled by the association unit number 82, and the latches 220, 226 and 228 are coupled to provide the replacement directory bank indication signal 68.

As seen from comparison between FIGS. 2 and 6, the embodiment shown in FIG. 6 is featured in that the invalidation block priority controller and the LRU block priority controller are respectively divided into two circuits provided independently for each of the available association unit numbers, i.e., the "four ways" and the "two ways". Namely, the second embodiment includes the "four way" invalidation block priority controller 208, the "two way" invalidation block priority controller 212, the "four way" LRU block priority controller 218 and the LRU hit block indicator 216. Particularly, it is sufficient in the case of "two ways" if the controller has an output of one bit, since it is only necessary to indicate two stages of priority, a high place and a low place. In addition, it should be noted that the two stages of priority required in the case of the "two ways" do not need the previous LRU status value for calculating a new LRU status.

It can be said that the second embodiment has a large number of logic circuit elements, a complicated circuit structure and a decreased generality as compared with the first embodiment. But, the second embodiment has a circuit structure easily understandable to persons skilled in the art, and therefore, checking is easy.

In the second embodiment, the latches 200, 202, 204, 220, 226 and 228 function as interface for transfer of the LRU status signal 86 and the replacement directory bank indication signal 68. These latches are latch-controlled by the association number signal 82 when a final result is transferred.

The invalidation block indicator 210 for "two ways" has a function corresponding to the AND gates shown in FIG. 3, and therefore, generates two invalidation signals required when the four banks are grouped into two.

The LRU block indicator 216 for "two ways" has a function corresponding to the OR gates shown in FIG. 4, and therefore, generates two hit signals required when the four banks are grouped into two.

The replacement directory bank encoder 224 for "two ways" operates to combine the upper place portion of the address tag field and the output of the invalidation block priority controller 212.

When a parity error occurs in any block, the error block minimum priority indicator 214 receives an error block indication signal 90 which indicates that the parity error occurrence block should not be used, and introduces the content of the error block indication signal 90 into the discrimination for LRU.

Figure 7:
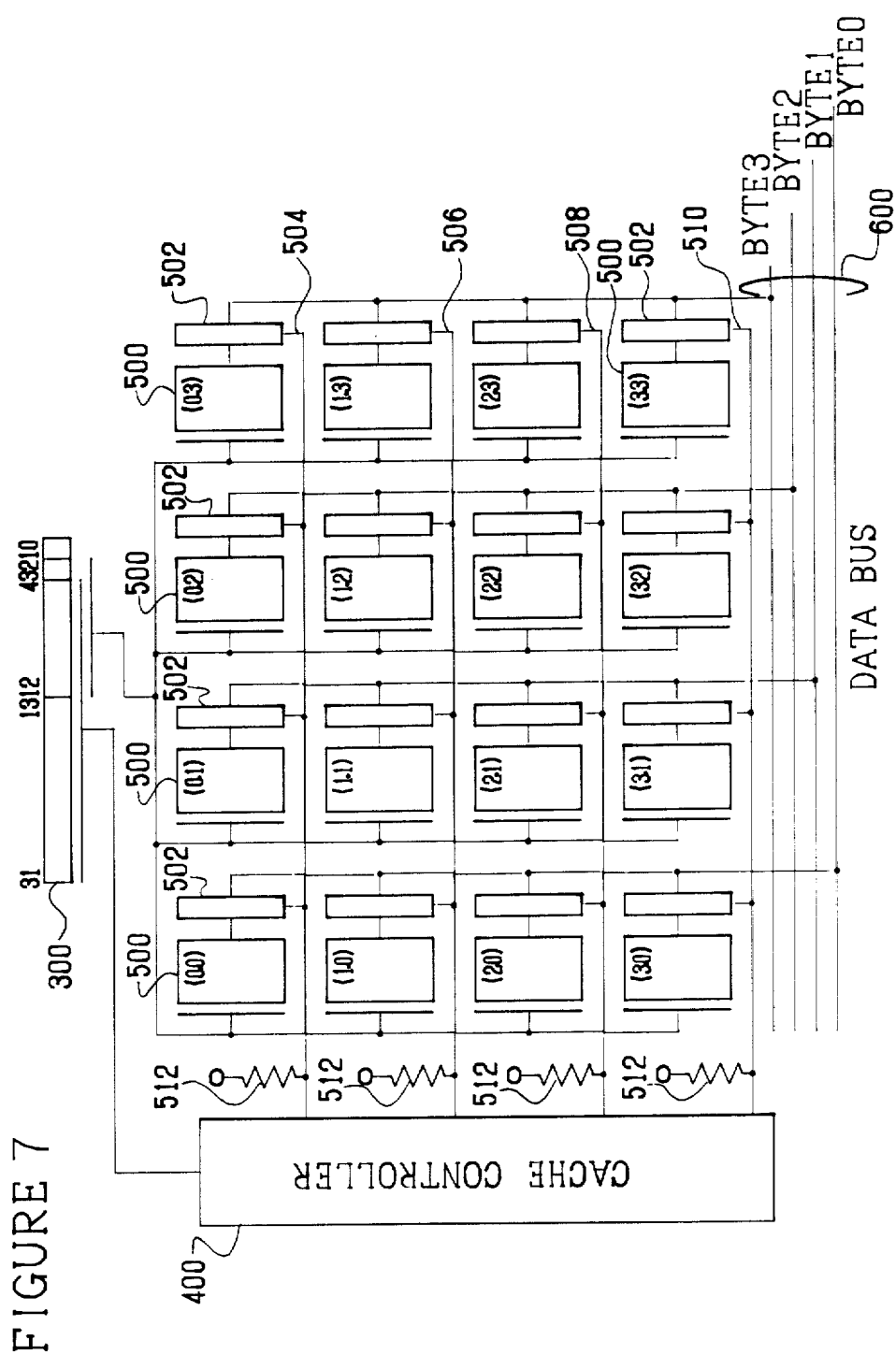
FIG. 7 is a block diagram illustrating an arrangement of a cache data memory combined with the cache controller in accordance with the present invention.

The above mentioned cache controllers can be used in combination with a four way set associative type of data cache memory as shown in FIG. 7. The shown data cache memory includes a cache access address buffer 300, and a cache controller 400 which can be either the above mentioned first embodiment or the above mentioned second embodiment. Further, a plurality of memory elements 500 are arranged in a matrix having a plurality of columns and a plurality of lines. A coordinate position of each memory element is indicated with (m, n) within a small block which indicates one memory element. "m" indicates the coordinate position in each association unit and "n" shows the byte coordinate of a data bus. The memory elements belonging to the same column are connected commonly (through a decoder not shown) to the address buffer 300 as shown.

Each of memory elements 500 has a bi-directional buffer 502, and the buffers of the elements belonging to the same column are connected commonly to one corresponding line of a data bus 600. The buffers of the elements belonging to the same line have a control terminal connected to one of control signal lines 504, 506, 508 and 510 of the cache controller 400. The control signal lines 504, 506, 508 and 510 are pulled up by a pull-up resistor 512, respectively.

More specifically, for example, the memory element matrix is composed of an random access memory of $2K \times 8$ bits which can be designated by a 11-bit address and can output a 8-bit data. The data bus 600 has a bit length of 32 bits.

Each of the control signal lines 504 to 510 of the cache controller 400 indicates the access to one corresponding association unit. If the cache is hit, the cache controller 400 activates one of the control signal lines 504 to 510. Namely, one association unit is designated. Thus, a data transfer is executed between the selected memory elements in the designated association unit and the data bus.

The invention has thus been shown and described with reference to the specific embodiments. However, it should be noted that the present invention is in no way limited to the details of the illustrated structures but changes and modifications may be made within the scope of the appended claims.

I claim:

1. An associative type cache controller which includes a plurality of directory banks each holding an address tag of a cache block, each of the directory banks having a comparison means for comparing the content of the directory bank with a tag portion of a current reference address, comprising means for holding the association unit number, and replacement block determining means for indicating, in accordance with the content of the association unit number holding means, the directory bank including the cache block to be replaced at the time of cache replacement, so that the replacement directory banks are limited in accordance with the designated association unit number, whereby the association unit number of a related cache memory can be changeably designated.

2. A cache controller claimed in claim 1 wherein the replacement block determining means is adapted to indicate, in accordance with the content of the association unit number holding means and a portion of the tag of the current reference address, the directory bank including the cache block to be replaced at the time of cache replacement, so that the replacement directory banks are designated in accordance with the designated association unit number.

* * * * *